(12) United States Patent
Morigaki et al.

(10) Patent No.: US 6,777,136 B2
(45) Date of Patent: Aug. 17, 2004

(54) LITHIUM POLYMER BATTERY AND METHOD FOR PRODUCING THE SAME

(75) Inventors: Kenichi Morigaki, Nishinomiya (JP); Norishige Nanai, Hirakata (JP); Yasuyuki Shibano, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 247 days.

(21) Appl. No.: 09/972,158

(22) Filed: Oct. 9, 2001

(65) Prior Publication Data

US 2002/0061448 A1 May 23, 2002

(30) Foreign Application Priority Data

Oct. 11, 2000 (JP) ........................................ 2000-310764

(51) Int. Cl.[7] .......................... H01M 2/16; H01M 6/16; H01M 4/62
(52) U.S. Cl. ...................... 429/253; 429/217; 429/303; 429/316; 429/317; 29/623.1
(58) Field of Search ................................. 429/253, 249, 429/231.1, 300, 303, 304, 309, 312, 316, 317, 323, 217, 732; 29/623.1

(56) References Cited

U.S. PATENT DOCUMENTS

| | | |
|---|---|---|
| 5,296,318 A | 3/1994 | Gozdz et al. |
| 6,037,080 A | 3/2000 | Kronfli et al. |
| 6,387,570 B1 * | 5/2002 | Nakamura et al. ........... 429/300 |

FOREIGN PATENT DOCUMENTS

| | | | |
|---|---|---|---|
| JP | 55-35420 | 3/1980 | |
| JP | 3-171567 | 7/1991 | |
| JP | 4-306560 | 10/1992 | |
| JP | 11-35765 | 2/1999 | |
| JP | 11-39941 | 2/1999 | |
| JP | 11053936 A * | 2/1999 | ............ H01B/1/12 |
| JP | 11-228902 | 8/1999 | |

OTHER PUBLICATIONS

Hawley's Condensed Chemical Dictionary, 11th edition, p. 323, 1987 (no month).*

* cited by examiner

Primary Examiner—Patrick Ryan
Assistant Examiner—Tracy Dove
(74) Attorney, Agent, or Firm—McDermott, Will & Emery LLP

(57) ABSTRACT

In order to improve a storage stability at high temperatures of a lithium polymer battery including: a positive electrode comprising a lithium-containing complex oxide; a negative electrode comprising a material capable of absorbing and desorbing a lithium ion; and a separator comprising a liquid organic electrolyte and a host polymer retaining the liquid organic electrolyte, the separator is rendered homogeneous and excellent in the affinity with the organic electrolyte by using a crosslinked copolymer having a main-chain comprising a vinylidene fluoride unit and a side-chain comprising an alkylene oxide unit and at least one of an acrylate unit and methacrylate unit as the host polymer.

6 Claims, 1 Drawing Sheet

LITHIUM POLYMER BATTERY AND METHOD FOR PRODUCING THE SAME

BACKGROUND OF THE INVENTION

The present invention relates to a lithium polymer battery in which a gel electrolyte comprising a liquid organic electrolyte and a host polymer retaining thereof is interposed between the positive electrode and the negative electrode as a separator.

Lithium ion secondary batteries, which include a liquid organic electrolyte, a lithium-containing complex oxide as a positive electrode active material and a carbon material as a negative electrode active material, have a high voltage and high energy density, and exhibit excellent characteristics at low temperatures as compared with secondary batteries having an aqueous electrolyte. These batteries are also excellent in the cycle stability and safety since they do not use a lithium metal in the negative electrode, and they have rapidly been put into practical use. Also, lithium polymer batteries using, as a separator, a gel electrolyte comprising a liquid organic electrolyte and a host polymer retaining thereof have been researched as thin and lightweight novel batteries.

Since the separator of lithium ion batteries are composed of materials which do not readily dissolve or swell in a liquid organic electrolyte, the cycle characteristic of the batteries rarely deteriorate due to the reaction of the separator with the electrolyte. Also, binders contained in the positive electrode and the negative electrode of lithium ion batteries do not relate to the deterioration in the cycle characteristics.

However, since lithium polymer batteries use a gel electrolyte as the separator, chemical stability and reactivity with a liquid organic electrolyte of a host polymer greatly influence the deterioration of the batteries particularly at high temperatures. For example, a liquid organic electrolyte using lithium hexafluorophosphate as a solute reacts with a host polymer such as polyethylene oxide at high temperatures and cuts a network structure formed by the host polymer. As a result, the electrolyte becomes unable to stay in the gel state and the function of bonding the positive electrode and the negative electrode is impaired.

As the host polymer of the gel electrolyte, a variety of polymer materials have been proposed so far. Polymer materials containing an ethylene oxide unit (e.g. Japanese Laid-Open Patent Publication No. Hei 3-171567) have excellent affinity with liquid organic electrolytes, but they have problems concerning thermal stability because they cause sol/gel transition at high temperatures and are easily oxidized.

Materials composed of polyacrylonitrile (e.g. Japanese Laid-Open Patent Publication No. Hei 4-306560) show incombustibility and give a high ion conductivity. However, they have a good affinity with a limited number of liquid organic electrolytes and have problems in the thermal stability of the gel.

Polymer materials containing a vinylidene fluoride unit (e.g. U.S. Pat. No. 5,296,318) have a wide potential range where they are electrochemically stable and have incombustibility because they contain fluorine. However, they have the problem that they have a low affinity with liquid organic electrolytes at high temperatures.

Materials composed of polyacrylate (e.g. Japanese Laid-Open Patent Publication No. Sho 55-35420) are excellent in retention of liquid organic electrolytes, but they are electrochemically unstable.

Also, there are proposed methods of copolymerizing each of the above materials with other monomers, chemically crosslinking the same, or alloying the same with other polymers.

For example, proposed are a mixture of alkylene oxide with a fluorocarbon polymer (Japanese Laid-Open Patent Publication No. Hei 11-35765), and a mixture of polyvinylidene fluoride with a copolymer containing an acrylate unit capable of bonding with metals and an organic compound having a mercapto group (Japanese Laid-Open Patent Publication No. Hei 11-228902). However, there is the problem that a gel electrolyte in the homogenous state cannot be obtained by using these mixtures.

Further, proposed are a copolymer of fluoroolefin with a hydrocarbon having an unsaturated bond (Japanese Laid-Open Patent Publication No. Hei 11-39941), and a copolymer in which acrylic acid is grafted with polyvinylidene fluoride by irradiation of $\gamma$-ray (U.S. Pat. No. 6,037,080). However, these copolymers have a low affinity with liquid organic electrolytes and do not readily form a gel electrolyte.

Consequently, lithium polymer batteries having a gel electrolyte are generally inferior in the storage characteristics at high temperatures as compared with lithium ion batteries having no gel electrolyte. For example, when lithium polymer batteries are stored at 80° C. for three days, the capacity obtained by one hour rate discharging could be reduced to 80% or less of the capacity before the storage.

BRIEF SUMMARY OF THE INVENTION

The present invention has an object to render a gel electrolyte homogenous and excellent in the affinity with a liquid organic electrolyte by using a specific copolymer as a host polymer of the gel electrolyte constituting a separator, thereby to improve the stability at high temperatures of the gel electrolyte and to provide a highly reliable lithium polymer battery which is excellent in the storage characteristics at high temperatures.

Specifically, the present invention relates to a lithium polymer battery including: a positive electrode comprising a lithium-containing complex oxide; a negative electrode comprising a material capable of absorbing and desorbing a lithium ion; and a separator comprising a liquid organic electrolyte and a host polymer retaining the liquid organic electrolyte, wherein the host polymer is a crosslinked copolymer, which has a main-chain comprising a vinylidene fluoride unit, and a side-chain comprising an alkylene oxide unit and at least one of an acrylate unit and methacrylate unit.

In the aforementioned copolymer, the content of the side-chain is preferably 1 to 30 wt %.

The aforementioned side-chain is preferably composed of polyethylene glycol diacrylate or polyethylene glycol dimethacrylate wherein an average molecular weight of the diacrylate or dimethacrylate is 300 to 1600.

At least one of the positive electrode and the negative electrode preferably contains a binder comprising a modified polyvinylidene fluoride having an oxygen-containing group.

The positive electrode preferably contains a binder comprising a modified vinylidene fluoride-hexafluoropropylene copolymer having an oxygen-containing group.

The negative electrode preferably contains a binder comprising an ionomer containing at least one of an acrylate unit and methacrylate unit.

The negative electrode preferably contains a binder comprising a particulate rubber containing an acrylonitrile unit, a styrene unit and a butadiene unit.

The present invention also relates to a method for producing a lithium polymer battery comprising:

(1) a step of preparing an electrode assembly by laminating a positive electrode and a negative electrode while interposing therebetween a copolymer having a main-chain comprising a vinylidene fluoride unit and a side-chain comprising an alkylene oxide unit and at least one of an acrylate unit and methacrylate unit;

(2) a step of housing the aforementioned electrode assembly into a battery case, and subsequently introducing a thermal polymerization initiator for the copolymer and a liquid organic electrolyte therein and sealing the battery case; and (3) a step of forming a separator comprising a gel electrolyte between the positive electrode and the negative electrode by heating the sealed battery to crosslink the copolymer and make the crosslinked copolymer retain the organic electrolyte.

By the above method, since the host polymer is crosslinked by thermal polymerization after the host polymer have contained the liquid organic electrolyte, a gel electrolyte which has a close and chemically stable network structure and is excellent in the stability at high temperatures and in the resistance to oxidization. As a result, the storage characteristics at high temperatures of the polymer battery are also improved.

In the resulting gel electrolyte, the crosslinked host polymer has a sufficient affinity with the liquid organic electrolyte, and the separator is closely adhered to the surface of the positive electrode and the negative electrode.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
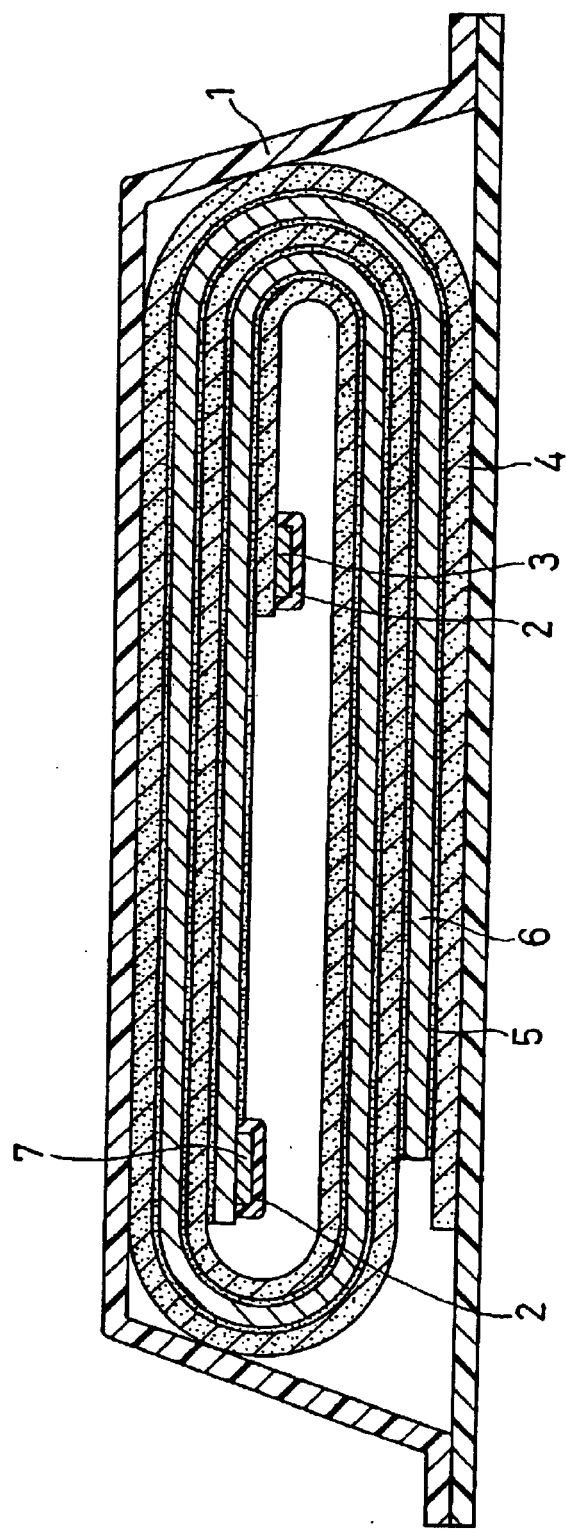
FIG. 1 is a transverse cross sectional view of an example of a polymer battery of the present invention.

The host polymer used in the present invention is a crosslinked copolymer having a branched structure composed of a main-chain or a trunk chain, and a side-chain. The main-chain has a polyvinylidene fluoride structure and the side-chain has an alkylene oxide unit and at least one of an acrylate unit and methacrylate unit. Since the main-chain contains a vinylidene fluoride unit, the main-chain has an excellent stability at high temperatures. On the other hand, since the side-chain contains an alkylene oxide unit, the side-chain has an excellent affinity with a liquid organic electrolyte and gives an excellent gel-forming function to the host polymer.

The host polymer as above has different physical properties from those of a mixture of polyvinylidene fluoride with a polyalkylene oxide having an acrylate unit or methacrylate unit at the end of the chain. In the above host polymer, the polyvinylidene fluoride structure and the alkylene oxide structure are distributed homogeneously as compared with the above mixture. The homogeneous host polymer has an extremely good affinity with a liquid organic electrolyte and has a good strength. Consequently, it provides a gel electrolyte having an excellent stability at high temperatures.

The molecular weight of the aforementioned copolymer before crosslinking is preferably about 100,000 to 1,500,000.

The side-chain contains at least one of an acrylate unit and methacrylate unit which has a polymerizable double bond. Thus, the aforementioned copolymer can be crosslinked after the copolymer has swelled in a liquid organic electrolyte. The crosslinked host polymer has a good stability at high temperatures, an excellent affinity with the liquid organic electrolyte and a homogeneous network structure, and therefore the gel electrolyte becomes to have an excellent stability at high temperatures.

The main-chain of the above-mentioned copolymer preferably has a structure of polyvinylidene fluoride, a copolymer of vinylidene fluoride-hexafluoropropylene, a copolymer of vinylidene fluoride-chlorotrifluoroethylene, a copolymer of vinylidene fluoride-pentafluoropropylene, a copolymer of vinylidene fluoride-hexafluoropropylene-tetrafluoroethylene and a copolymer of vinylidene fluoride-perfluoromethyl vinyl ether-tetrafluoroethylene. The molecular weight of the main-chain is preferably about 100,000 to 1,000,000.

Examples of the alkylene oxide constituting the side-chain of the above copolymer are ethylene oxide and propylene oxide. Only one kind or a plurality of these units may be contained in the side-chain. The side-chain preferably contains an acrylate unit or methacrylate unit at the end of the polyalkylene oxide structure.

In the above copolymer, the content of the side-chain is preferably 1 to 30 wt % and more preferably 1 to 10 wt %. When the content of the side-chain is less than 1 wt %, the host polymer has an insufficient gel-forming ability, and when the content is more than 30 wt %, the host polymer has a decreased stability at high temperatures.

The side-chain is preferably composed of a polyalkylene glycol diacrylate or polyalkylene glycol dimethacrylate such as polyethylene glycol diacrylate, polyethylene glycol dimethacrylate, polypropylene glycol diacrylate and polypropylene glycol dimethacrylate. The average molecular weight of the polyalkylene glycol diacrylate or polyalkylene glycol dimethacrylate is preferably 300 to 1,600. When the average molecular weight thereof is less than 300, the host polymer has an insufficient gel-forming ability, and when the average molecular weight is more than 1,600, the host polymer has a decreased stability at high temperatures.

The above copolymer can be obtained, for example, by oxidizing polyvinylidene fluoride to introduce an oxygen-containing group such as an OH group, COOH group and $O_2$ radical group, and reacting such oxygen-containing group with a polyalkylene glycol diacrylate or polyalkylene glycol dimethacrylate.

An example of a method for producing the above copolymer will be described.

First, polyvinylidene fluoride (average molecular weight: 100,000 to 1,000,000) is dissolved in N-methyl-2-pirrolidone (hereinafter referred to NMP) in a reactor, and polyvinylidene fluoride is subjected to oxidation reaction under oxygen bubbling at 50 to 90° C., preferably at about 70° C. for 6 to 72 hours, preferably for about 24 hours.

Later-described modified polyvinylidene fluoride having an oxygen-containing group and a modified vinylidene fluoride-hexafluoropropylene copolymer having an oxygen-containing group that are used as an electrode binder can be obtained by the above-mentioned method.

Thereafter, polyethylene glycol diacrylate having an average molecular weight of about 1,100, for example, is added to the aforementioned reactor and reacted for 3 to 48 hours, preferably for about 12 hours. The amount of polyethylene glycol diacrylate reacted with the polyvinylidene fluoride can be readily evaluated by the change of weight from the weight of polyvinylidene fluoride before the reaction to the weight of the copolymer obtained after the reaction.

The reaction of polyethylene glycol diacrylate with polyvinylidene fluoride may be carried out under the presence of an alkaline substance such as amines, under an oxygen atmosphere or under the irradiation of electron beam after preparing a homogenous solution containing polyethylene glycol diacrylate and polyvinylidene fluoride.

Next, an example of a method for forming a separator comprising a gel electrolyte will be described.

First, an inorganic filler and the aforementioned copolymer are dispersed in NMP to prepare a slurry. The amount used of the inorganic filler is 10 to 100 parts by weight per 100 parts by weight of the copolymer, and the amount used of NMP is 100 to 500 parts by weight per 100 parts by weight of the copolymer.

As the inorganic filler, fine powders of silicon dioxide, aluminum oxide and the like subjected to hydrophobic treatment on the surface thereof can be used. Next, the above slurry is applied onto both surfaces of the negative electrode and dried to form separator layers containing the inorganic filler and the copolymer.

This negative electrode and the positive electrode are laminated with the separator layer interposed therebetween, and rolled up to prepare an electrode assembly. After housing the electrode assembly into a battery case, a liquid organic electrolyte mixed with 0.01 to 1 wt %, preferably about 0.1 wt % of a thermal polymerization initiator relative to the weight of the copolymer is poured under reduced pressure into the battery case, and then the battery case is sealed. As the thermal polymerization initiator, 2,2'-azobis-2,4-dimethylvaleronitrile (trade name: V-65, manufactured by Wako Pure Chemical Industries, Ltd.) or the like is preferred. Then, by heating the sealed battery at 50 to 80° C., preferably at about 70° C. for 15 minutes to 4 hours, preferably for about 1 hour, the copolymer in the separator layer is crosslinked and the separator comprising a gel electrolyte is formed in the battery.

The positive electrode and the negative electrode contain an active material and a binder. As the positive electrode active material, lithium-containing complex oxides such as $LiCoO_2$, $LiNiO_2$, $LiMn_2O_4$, $LiMnO_2$ and $LiV_3O_8$ are used, for example. As the negative electrode active material, carbon materials such as natural graphite, artificial graphite and graphitized carbon fibers; alloys and oxides comprising Si, Sn, Al, B, Ge, P, Pb and the like; and nitrides such as $Li_3N$, $Ni_{3-x}Co_xN$ are used.

The liquid organic electrolyte forming the gel electrolyte is prepared by dissolving a solute in an organic solvent. As the solute, $LiPF_6$, $LiBF_4$, $LiClO_4$, $LiN(CF_3SO_2)_2$, $LiN(C_2F_5SO_2)_2$ and the like are used. As the organic solvent, cyclic or linear carbonates such as ethylene carbonate, propylene carbonate, butylene carbonate, dimethyl carbonate, diethylcarbonate, ethyl methyl carbonate, methyl propyl carbonate and ethyl propyl carbonate, and cyclic or linear esters such as γ-butyrolactone and ethyl propionate are used. The solutes and the organic solvents may be used solely or in combination of two or more.

In the polymer battery, by charging and discharging, lithium ions dissolved in the solvent move between the positive electrode and the negative electrode. If a material which easily swells in the liquid organic electrolyte is used as the binder, the organic solvent moves into the electrodes together with the move of lithium ions, thereby to swell the electrode plates. In particular, in the negative electrode, the electrode plate greatly swells due to the organic solvent moving at the time of charging, which is liable to cause breakage of the electronically conductive network in the electrode plate and a liberation of the active material particles. Consequently, as the binder contained in the positive electrode or the negative electrode, desired is one not liable to swell in the organic solvent, having a good ability to bind the active materials and excelling in the bonding property with metal current collectors and in the affinity with the separator comprising the gel electrolyte.

Conventionally, polyvinylidene fluoride or the like has been used in many cases as the binder. In the structure of polyvinylidene fluoride, since fluorine and hydrogen are arranged alternately and each monomer unit is polarized, it is known that dipole-dipole interaction takes place inside the molecule and between the molecules. However, since polyvinylidene fluoride contains fluorine, polyvinylidene fluoride has a small surface energy and cannot be expected so much for chemical binding effect.

In a preferred embodiment of the present invention, for example, a modified polyvinylidene fluoride having an oxygen-containing group and having a molecular weight of 100,000 to 1,000,000, and a modified vinylidene fluoride-hexafluoropropylene copolymer having an oxygen-containing group and having a molecular weight of 100,000 to 1,000,000 are used. These polymers are provided with a chemical binding function by introducing an oxygen-containing group such as a hydroxyl group, carbonyl group and carboxylic group into polyvinylidene fluoride and a copolymer of vinylidene fluoride-hexafluoropropylene. When these binders are used, the bonding force between the metal current corrector and the electrode mixture and between the positive electrode and the separator, and the binding force between the particles in the electrode mixture can be increased by the effect of the oxygen-containing group. The oxygen-containing group works effectively when the ratio of the introduced oxygen-containing group is about 0.1 to 2 wt % to the weight of the polymer before modified.

The oxygen-containing group can be introduced into polyvinylidene fluoride or a copolymer of vinylidene fluoride-hexafluoropropylene by the oxidation reaction accompanying dehydrofluoric acid reaction in NMP, as described above. This oxidation reaction is accelerated by the presence of alkaline substances such as lithium hydroxide and amines. A modified polyvinylidene fluoride having an oxygen-containing group and a modified vinylidene fluoride-hexafluoropropylene copolymer having an oxygen-containing group are available from several manufactures. As commercially available materials, MKB polymer manufactured by ATOFINA CHEMICALS, Inc.(formerly, Elf atochem), #9130 manufactured by Kureha Chemical Industry Co., Ltd. and the like can be mentioned.

The lithium-containing complex oxide in the positive electrode is readily mixed with alkaline impurities. Therefore, from the viewpoint of suppressing the dehydrofluoric acid reaction accompanying the viscosity increase of the positive electrode active material, it is preferable to use a modified vinylidene fluoride-hexafluoropropylene copolymer having an oxygen-containing group rather than to use a modified polyvinylidene fluoride having an oxygen-containing group.

The amount of the binder contained in the positive electrode is preferably 1 to 10 parts by weight per 100 parts by weight of the positive electrode active material.

As the binder of the negative electrode, a modified polyvinylidene fluoride having an oxygen-containing group and having a molecular weight of 100,000 to 1,000,000 can be used. In view of the bonding property of the negative electrode with the separator layer, an ionomer containing at least one of an acrylate unit and methacrylate unit, and a particulate rubber containing an acrylonitrile unit, a styrene unit and a butadiene unit are preferable.

As the above ionomer, a polymer containing an ethylene unit and an acrylate unit is preferable, for example.

The above particulate rubber preferably contains an acrylate unit such as a 2-ethylhexyl acrylate unit in addition to an acrylonitrile unit, a styrene unit and a butadiene unit.

The amount of the binder contained in the negative electrode is preferably 0.5 to 10 parts by weight and more preferably 1 to 3 parts by weight per 100 parts by weight of the negative electrode active material.

FIG. 1 is a cross sectional view of an example of a flat-type polymer battery. A battery case 1 is composed of a laminate film of an aluminum foil and resin films. An insulating tape 2 made of polypropylene fixes a positive electrode lead and a negative electrode lead. A positive electrode lead 3 made of aluminum is connected to a positive electrode 4. A separator 5 comprising a gel electrolyte is interposed between the positive electrode 4 and a negative electrode 6. The negative electrode 6 is connected with a negative electrode lead 7 made of copper.

The positive electrode 4 is prepared as follows: a positive electrode mixture is applied onto a positive electrode current collector made of an aluminum foil, and the resultant plate is dried, rolled and cut to a prescribed size, and the positive electrode lead is welded thereto. The positive electrode mixture is prepared, for example, by dispersing a mixture of a lithium-cobalt complex oxide as the positive electrode active material and acetylene black as an electrically conductive agent into an NMP solution of a modified vinylidene fluoride-hexafluoropropylene copolymer having an oxygen-containing group.

The negative electrode 6 is prepared as follows: a negative electrode mixture is applied onto a negative electrode current collector made of a copper foil, and the resultant plate is dried, rolled and cut to a prescribed size, and the negative electrode lead is welded thereto. The negative electrode mixture is prepared, for example, by dispersing a graphite as the negative electrode active material into an NMP solution of a modified vinylidene fluoride having an oxygen-containing group.

FIG. 1 shows a flat-type battery having a wound-up electrode assembly as a typical example. However, it is also possible to use a folded-type electrode assembly, a laminate-type electrode assembly and the like.

Next, the present invention will be described specifically with reference to examples.

EXAMPLE 1

A flat-type polymer battery as shown in FIG. 1 was produced by using a lithium-cobalt complex oxide ($LiCoO_2$) as the positive electrode active material and a graphite as the negative electrode active material.

First, a mixture of $LiCoO_2$ and acetylene black mixed at a ratio by weight of 90:10 was dispersed in an NMP solution of a modified polyvinylidene fluoride having an oxygen-containing group (MKB manufactured by ATOFINA CHEMICALS Inc., average molecular weight: 500,000) as a binder to prepare a positive electrode mixture. This positive electrode mixture was applied onto both surfaces of a current collector of an aluminum foil, dried, rolled, and cut to a prescribed size and welded to a positive electrode lead, thereby to give a positive electrode.

Next, a graphite powder was dispersed in the same NMP solution of the modified polyvinylidene fluoride as used in the positive electrode to prepare a negative electrode mixture. This negative electrode mixture was applied onto both surfaces of a current collector of a copper foil, dried, rolled, and cut to a prescribed size and welded to a negative electrode lead, thereby to give a negative electrode.

On the other hand, a solution was prepared by dissolving 100 parts by weight of a copolymer of polyethylene glycol diacrylate (average molecular weight: 1,100) and the same modified polyvinylidene fluoride as used in the positive electrode and the negative electrode, which was obtained by the reaction described above, in 100 parts by weight of NMP. In the obtained copolymer, the content of the polyethylene glycol diacrylate portion was controlled to be 8 wt %. Into this solution, 30 parts by weight of a fine powder of silicone dioxide whose surface was made hydrophobic (RX200 manufactured by Nippon Aerosil Co., Ltd.) was dispersed to prepare a paste for the separator layer.

The resultant paste was applied onto both surfaces of the negative electrode and dried to form separator layers of about 15 μm. Then, the positive electrode and the negative electrode were laminated each other and rolled to unify the both electrodes. This was then wound up to have an oblong shape to give an electrode assembly.

The obtained electrode assembly was housed in a battery case composed of a laminate film of aluminum, polyethylene and a modified polypropylene, into which a liquid organic electrolyte was poured. After carrying out pressure-reducing process for several times, the opening of the battery case was sealed tightly. As the liquid organic electrolyte, a solution prepared by dissolving 1.5 mol/liter of Lithium hexafluorophosphate ($LiPF_6$) as a solute into a mixed solvent of ethylene carbonate, diethyl carbonate and ethyl methyl carbonate mixed at a volume ratio of 1:1:1 was used. To the liquid organic electrolyte, 0.1 wt %, relative to the copolymer component of the separator layer, of V-65 manufactured by Wako Pure Chemical Industries, Ltd. was added as a polymerization initiator.

Next, the copolymer of the separator layer was crosslinked by heating the battery at 60° C. for 1 hour, thereby to complete the polymer battery.

EXAMPLE 2

A polymer battery was produced in the same manner as in Example 1 except that the content of the polyethylene glycol diacrylate portion in the obtained copolymer was controlled to be 1 wt %.

EXAMPLE 3

A polymer battery was produced in the same manner as in Example 1 except that the content of the polyethylene glycol diacrylate portion in the obtained copolymer was controlled to be 30 wt %.

EXAMPLE 4

A polymer battery was produced in the same manner as in Example 1 except that the average molecular weight of polyethylene glycol diacrylate was changed to 310 and that the content of the polyethylene glycol diacrylate portion in the obtained copolymer was controlled to be 12 wt %.

EXAMPLE 5

A polymer battery was produced in the same manner as in Example 1 except that the average molecular weight of polyethylene glycol diacrylate was changed to 1,600 and that the content of the polyethylene glycol diacrylate portion in the obtained copolymer was controlled to be 8 wt %.

EXAMPLE 6

A polymer battery was produced in the same manner as in Example 1 except that polyethylene glycol dimethacrylate having an average molecular weight of 1,100 was used in place of the polyethylene glycol diacrylate and that the content of the polyethylene glycol dimethacrylate portion in the obtained copolymer was controlled to be 5 wt %.

EXAMPLE 7

A polymer battery was produced in the same manner as in Example 1 except that a modified vinylidene fluoride-hexafluoropropylene copolymer having an oxygen-containing group (MKB manufactured by ATOFINA CHEMICALS, Inc.) was used as the binder for the positive electrode and that a particulate rubber (BM400B manufactured by Nippon Zeon Co., Ltd.) containing a styrene unit, butadiene unit, 2-ethylhexyl acrylate unit and acrylonitrile unit was used as the binder for the negative electrode.

EXAMPLE 8

A polymer battery was produced in the same manner as in Example 1 except that a modified copolymer of vinylidene fluoride-hexafluoropropylene was used as the binder for the positive electrode.

EXAMPLE 9

A polymer battery was produced in the same manner as in Example 1 except that an ethylene-acrylate copolymer containing 80 wt % of ethylene unit was used as the binder for the negative electrode.

EXAMPLE 10

A polymer battery was produced in the same manner as in Example 1 except that polyvinylidene fluoride (301F manufactured by ATOFINA CHEMICALS, Inc.) was used as the binder for the positive electrode and that a copolymer of vinylidene fluoride-hexafluoropropylene (2801 manufactured by ATOFINA CHEMICALS, Inc.) was used as the binder for the negative electrode.

COMPARATIVE EXAMPLE 1

A polymer battery was produced in the same manner as in Example 1 except for the following: a paste for the separator layer was prepared by dispersing 30 parts by weight of a fine powder of silicon dioxide having a hydrophobic surface (RX200 manufactured by Nippon Aerosil Co., Ltd.) into a solution prepared by dissolving 100 parts by weight of a copolymer of vinylidene fluoride-hexafluoropropylene (2801 manufactured by ATOFINA CHEMICALS, Inc.) into 100 parts by weight of NMP, the polymerization initiator V-65 was not added to the liquid organic electrolyte, and the heating at 60° C. for 1 hour was omitted.

COMPARATIVE EXAMPLE 2

A polymer battery was produced in the same manner as in Comparative Example 1 except that polyethylene oxide (average molecular weight: 200,000) was used in place of the copolymer of vinylidene fluoride-hexafluoropropylene.

EXAMPLE 11

A polymer battery was produced in the same manner as in Example 1 except that ethylene glycol dimethacrylate (molecular weight: 198) was used in place of the polyethylene glycol diacrylate having an average molecular weight of 1,100 and that the content of the ethylene glycol dimethacrylate portion in the obtained copolymer was controlled to be 12 wt %.

EXAMPLE 12

A polymer battery was produced in the same manner as in Example 1 except that polyethylene glycol diacrylate having an average molecular weight of 3,000 was used in place of the polyethylene glycol diacrylate having an average molecular weight of 1,100 and that the content of the polyethylene glycol diacrylate portion in the obtained copolymer was controlled to be 15 wt %.

EXAMPLE 13

A polymer battery was produced in the same manner as in Example 1 except that the content of the polyethylene glycol diacrylate portion in the obtained copolymer was controlled to be 0.5 wt %.

EXAMPLE 14

A polymer battery was produced in the same manner as in Example 1 except that polyethylene glycol diacrylate having an average molecular weight of 3,000 was used in place of the polyethylene glycol diacrylate having an average molecular weight of 1,100 and that the content of the polyethylene glycol diacrylate portion in the obtained copolymer was controlled to be 40 wt %.

Evaluation of the Batteries

The charge/discharge cycle of the batteries of Examples 1 to 14 and Comparative Examples 1 to 2 was repeated for 10 times under an atmosphere of 20° C. The conditions of the charge/discharge cycle were the charge termination voltage of 4.2 V, the discharge termination voltage of 3.0 V and the current of 1 hour rate. Thereafter, each battery was stored at 80° C. for 3 days and the charge/discharge cycle was carried out under the same conditions as above. The value obtained by dividing the discharge capacity of each battery after storage by the discharge capacity of the same battery before storage was shown in Tables 1 and 2 as the capacity maintenance rate by percentage. Table 1 shows the results of Examples 1 to 6, 11 to 14 and Comparative Examples 1 to 2, and Table 2 shows the results of Examples 7 to 10.

TABLE 1

| | Average molecular weight of side-chain | Ratio by weight of side-chain portion (wt %) | Capacity maintenance rate (%) |
|---|---|---|---|
| Ex. 1 | 1100 | 8 | 86 |
| Ex. 2 | 1100 | 1 | 85 |
| Ex. 3 | 1100 | 30 | 86 |
| Ex. 4 | 310 | 12 | 86 |
| Ex. 5 | 1600 | 8 | 87 |
| Ex. 6 | 1100 | 5 | 90 |
| Comparative Ex. 1 | — | — | 75 |
| Comparative | — | — | — |

TABLE 1-continued

| | Average molecular weight of side-chain | Ratio by weight of side-chain portion (wt %) | Capacity maintenance rate (%) |
|---|---|---|---|
| Ex. 2 | | | |
| Ex. 11 | 198 | 12 | 77 |
| Ex. 12 | 3000 | 15 | 76 |
| Ex. 13 | 1100 | 0.5 | 78 |
| Ex. 14 | 1100 | 40 | 75 |

TABLE 2

| | Capacity maintenance rate (%) |
|---|---|
| Ex. 7 | 90 |
| Ex. 8 | 87 |
| Ex. 9 | 85 |
| Ex. 10 | 80 |

In Table 1, since the batteries of Examples of the present invention, used, as the host polymer of the gel electrolyte, a crosslinked copolymer having a main-chain comprising a vinylidene fluoride unit and a side-chain comprising an acrylate unit or methacrylate unit and an alkylene oxide unit, these batteries improved capacity maintenance rate after storage at high temperatures as compared with the battery of Comparative Example 1 using a copolymer of vinylidene fluoride-hexafluoropropylene as the host polymer.

These results were presumably because the problem of separation of the gel electrolyte comprising a host polymer containing a vinylidene fluoride unit at high temperatures or the problem of liberation of the liquid organic electrolyte had been solved. In other words, the copolymer of vinylidene fluoride-hexafluoropropylene used in Comparative Example 1 could form a stable gel at around room temperature but tended to separate from the liquid organic electrolyte at 80° C. Since the liberated liquid organic electrolyte caused side reaction with the positive electrode or the negative electrode, a self-discharge of the battery proceeded. Also, since once liberated liquid organic electrolyte was not readily absorbed by the host polymer, the separator became uneven and the charge/discharge reaction became uneven as well, and thereby the utilization rate of the active material was decreased.

On the other hand, the host polymer used in the present invention could form a stable gel at high temperatures because the host polymer had a good affinity with the liquid organic electrolyte. Consequently, it was considered that the self-discharge of the battery and the unevenness of the separator were prevented.

The result of the battery of Comparative Example 2 was not shown in Table 1 since it became unable to repeat charge/discharge cycle on halfway. This was presumably because sol-gel transition of the gel electrolyte and oxidation decomposition reaction of an ethylene oxide unit occurred at high temperatures since it used polyethylene oxide only as the host polymer.

As to the size of the side-chain comprising an acrylate unit or methacrylate unit and an alkylene oxide unit, the effect of improving the storage characteristic at high temperatures was explicit when the average molecular weight was 300 to 1,600, as was clear from Examples 4, 5, 11 and 12. It was considered that when the side-chain was too short, the function of retaining the liquid organic electrolyte was insufficient; when the side-chain was too long, the property of the ethylene oxide unit appeared strongly and was readily decomposed at high temperatures. Similarly, when the content of the side-chain was too small, the property of the polyvinylidene fluoride appeared strongly; when it was too large, the property of the polyethylene oxide appeared strongly.

Table 2 shows that the battery of Example 7 wherein a modified copolymer of vinylidene fluoride-hexafluoropropylene is used as the binder for the positive electrode and a particulate rubber containing a styrene unit, a butadiene unit and an acrylate unit is used as the binder for the negative electrode, has the highest capacity maintenance rate. On the other hand, the battery of Example 10, wherein an unmodified polyvinylidene fluoride is used as the binder for the positive electrode and an unmodified copolymer of vinylidene fluoride-hexafluoropropylene is used as the binder for the negative electrode, has a relatively small effect of improvement in the capacity maintenance rate at high temperatures.

The reason why there was such a difference in the effect of improvement in the capacity maintenance rate at high temperatures was presumably due to the difference in the bonding property between the electrode plate and the separator and the degree of deformity of the electrode plate.

The batteries of Examples 8 and 9 used as the binder for the negative electrode a modified polyvinylidene fluoride having an oxygen-containing group or an ionomer containing an acrylate unit, which did not readily swell in the liquid organic electrolyte and which had a high ability of bonding between the current collector and the negative electrode mixture, and binding between the active material particles. Consequently, these batteries had a further improved stability at high temperatures as compared with the battery of Example 10 using a copolymer of vinylidene fluoride-hexafluoropropylene which readily swelled in the liquid organic electrolyte.

That is, when a copolymer of vinylidene fluoride-hexafluoropropylene is used as the binder for the negative electrode, the binder and the liquid organic electrolyte form a gel during charging at high temperatures, and along with that, the negative electrode swells to cut the electronically conductive network in the negative electrode, thereby reducing the capacity of the battery. On the other hand, when a modified polyvinylidene fluoride having an oxygen-containing group or an ionomer containing at least one of an acrylate unit and methacrylate unit, which does not readily swell in the liquid organic electrolyte, which has a high ability as the binder and which has a good bonding property with the separator, is used as the binder of the negative electrode, the deformation of the negative electrode by swelling or expansion is suppressed to minimum and thus the storage characteristics at high temperatures of the battery can be improved effectively.

The present invention uses a crosslinked copolymer having a main-chain comprising a vinylidene fluoride unit and a side-chain comprising an alkylene oxide unit and at least one of an acrylate unit and methacrylate unit as the host polymer of the gel electrolyte, and the invention preferably uses a binder which does not readily swells in the liquid organic electrolyte as the binder of the positive electrode and the negative electrode, so that a highly reliable polymer battery having an excellent storage stability at high temperatures can be provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A lithium polymer battery including: a positive electrode comprising a lithium-containing complex oxide; a negative electrode comprising a material capable of absorbing and desorbing a lithium ion; and a separator comprising a liquid organic electrolyte and a host polymer retaining said organic electrolyte;

wherein said host polymer is a crosslinked copolymer, which has a main-chain comprising a vinylidene fluoride unit, and a side-chain comprising an alkylene oxide unit and at least one of either an acrylate unit or methacrylate unit, wherein said side-chain is composed of polyethylene glycol diacrylate or polyethylene glycol dimethacrylate, said diacrylate or dimethacrylate having an average molecular weight of 300 to 1,600; and, wherein the content of said side-chain in said copolymer is 1 to 30 wt %.

2. The lithium polymer battery in accordance with claim 1, wherein said positive electrode or negative electrode contains a binder comprising a modified polyvinylidene fluoride having an oxygen-containing group.

3. The lithium polymer battery in accordance with claim 1, wherein said positive electrode contains a binder comprising a modified vinylidene fluoride-hexafluoropropylene copolymer having an oxygen-containing group.

4. The lithium polymer battery in accordance with claim 1, wherein said negative electrode contains a binder comprising an ionomer which contains at least one acrylate unit or methacrylate unit.

5. The lithium polymer battery in accordance with claim 1, wherein said negative electrode contains a binder comprising a particulate rubber containing an acrylonitrile unit, a styrene unit and a butadiene unit.

6. A method for producing a lithium polymer battery including:

(1) a step of preparing an electrode assembly by laminating a positive electrode comprising a lithium-containing complex oxide and a negative electrode comprising a material capable of absorbing and desorbing a lithium ion while interposing therebetween a copolymer, said copolymer having a main-chain comprising a vinylidene fluoride unit and a side-chain comprising an alkylene oxide unit and at least one of either an acrylate unit or methacrylate unit, wherein said side-chain is composed of polyethylene glycol diacrylate or polyethylene glycol dimethacrylate, said diacrylate or dimethacrylate having an average molecular weight of 300 to 1,600;

(2) a step of housing said electrode assembly in a battery case, and then introducing a polymerization initiator for said copolymer and a liquid organic electrolyte therein and sealing said battery case; and (3) a step of forming a separator between said positive electrode and said negative electrode by heating said sealed battery to crosslink said copolymer and make the crosslinked copolymer retain said organic electrolyte; and, wherein the content of said side-chain in said copolymer is 1 to 30 wt %.

* * * * *